(12) United States Patent
Bohlmann et al.

(10) Patent No.: US 11,859,407 B1
(45) Date of Patent: Jan. 2, 2024

(54) REMOTELY ACCESSIBLE SECURE ENCLOSURE

(71) Applicant: Allstate Insurance Company, Northbrook, IL (US)

(72) Inventors: Chad W. Bohlmann, Oak Park, IL (US); Emad S. Isaac, Downers Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 399 days.

(21) Appl. No.: 16/896,869

(22) Filed: Jun. 9, 2020

(51) Int. Cl.
| | | |
|---|---|---|
| E05B 19/00 | (2006.01) | |
| H04W 12/06 | (2021.01) | |
| G07C 9/00 | (2020.01) | |
| H04W 12/03 | (2021.01) | |

(52) U.S. Cl.
CPC ...... *E05B 19/0005* (2013.01); *G07C 9/00182* (2013.01); *H04W 12/03* (2021.01); *H04W 12/06* (2013.01); *G07C 2009/00198* (2013.01)

(58) Field of Classification Search
CPC ............ E05B 19/0005; G07C 9/00182; G07C 2009/00198; G07C 2009/00936; H04W 12/03; H04W 12/06; B60R 25/24; B60R 25/10; F02N 11/0807; F02N 11/0811
USPC ........................................... 70/158; 340/5.73
See application file for complete search history.

(56) References Cited

U.S. PATENT DOCUMENTS

| | | | | |
|---|---|---|---|---|
| 5,477,426 A | * | 12/1995 | Bethurum | ............ G06K 19/077 361/737 |
| 5,522,638 A | * | 6/1996 | Falcoff | ................ B60R 11/0264 455/99 |
| 6,362,771 B1 | * | 3/2002 | Schofield | ........... G07C 9/00182 455/99 |
| 6,559,558 B2 | * | 5/2003 | Quesnel | .............. F02N 11/0811 307/10.6 |
| 7,123,127 B2 | | 10/2006 | Mosgrove et al. | |
| 7,463,134 B1 | | 12/2008 | Stilley | |
| 7,999,656 B2 | | 8/2011 | Fisher | |
| 8,159,324 B2 | | 4/2012 | Zellweger et al. | |
| 8,841,987 B1 | | 9/2014 | Stanfield et al. | |
| 8,912,884 B2 | | 12/2014 | Fisher | |
| 9,218,700 B2 | | 12/2015 | Gautama et al. | |

(Continued)

FOREIGN PATENT DOCUMENTS

| | | |
|---|---|---|
| CN | 206006312 U | 3/2017 |
| EP | 3279882 A1 | 2/2018 |
| KR | 100958746 B1 | 5/2010 |

*Primary Examiner* — Fekadeselassie Girma
(74) *Attorney, Agent, or Firm* — Polsinelli PC (57) ABSTRACT

Systems, methods, and apparatuses in accordance with embodiments of the invention can use a variety of computing devices to interact with and/or control a secure enclosure for a key fob. The secure enclosure may enclose the key fob, and includes a computing device, a locking mechanism, and at least one actuator. An actuator may control the locking mechanism. The actuator, when activated, may exert a force on a key fob secured within the secure enclosure, which may cause one of the buttons of the key fob to be depressed. The computing device controls the activation of the actuators. The computing device may have wireless communication capability that allows a user to wirelessly control the actuators of the computing device, for example, to lock or unlock the enclosure, or to depress a button of the key fob secured within the enclosure.

20 Claims, 9 Drawing Sheets

(56) References Cited

U.S. PATENT DOCUMENTS

| | | |
|---|---|---|
| 9,409,297 B2 | 8/2016 | Tieman |
| 9,447,609 B2 | 9/2016 | Johnson et al. |
| 9,576,414 B2 | 2/2017 | Tieman |
| 9,918,524 B2 | 3/2018 | Byrd et al. |
| 10,042,381 B2 * | 8/2018 | Enshaee ................. G05B 15/02 |
| 2002/0008610 A1 | 1/2002 | Peterson |
| 2003/0112121 A1 * | 6/2003 | Wilson ............... G07C 9/00182 340/5.71 |
| 2004/0257200 A1 * | 12/2004 | Baumgardner .... G07C 9/00182 340/5.72 |
| 2009/0237206 A1 * | 9/2009 | Anderson ............... B60R 25/24 340/5.72 |
| 2013/0181822 A1 * | 7/2013 | Leavitt ................... G08C 17/02 340/12.28 |
| 2014/0342668 A1 | 11/2014 | Kyomitsu |
| 2016/0375908 A1 * | 12/2016 | Biemer ................ B60W 40/08 701/1 |
| 2017/0045906 A1 * | 2/2017 | Enshaee ................. H04W 4/80 |
| 2017/0045907 A1 * | 2/2017 | Enshaee ................. G05G 1/02 |
| 2020/0299998 A1 * | 9/2020 | Testa ................. G07C 9/00174 |

\* cited by examiner

REMOTELY ACCESSIBLE SECURE ENCLOSURE

FIELD OF USE

Aspects of the invention relate to secure enclosures for storing objects, and more specifically for storing a key fob and activating functionality of the key fob.

BACKGROUND

A person may wish to share a key, such as a vehicle key, in a secure manner such that only an authorized person may utilize the key's functionality. Currently, a person needing a vehicle key waits to physically receive the key from another person before being able to use the key.

Secure enclosures, such as lock boxes exist for allowing a person to securely access a key, key fob, or other access providing device. Some of these secure enclosures allow a user to remotely unlock the enclosure (e.g., with a wireless computing device). However, in conventional systems, there is no way for a first person to grant another person secure access to a key fob in a manner that allows the second person to utilize the functionality of the key fob buttons while the key fob is held inside the secure enclosure. This disclosure describes a secure enclosure that allows a first user to grant a second user access to the functionality of a key fob while the key fob is stored inside the enclosure.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Systems, methods, and apparatuses in accordance with embodiments of the invention can use a variety of computing devices to interact with and/or control a secure enclosure adapted to hold an object, such as a key fob. The secure enclosure may enclose (e.g., hold) the key fob, and includes a computing device, a locking mechanism, and at least one actuator. An actuator may control the locking mechanism. Another actuator, when activated, may exert a force on a key fob secured or held within the secure enclosure, which may cause one of the buttons of the key fob to be depressed. The computing device may control the activation of the actuators. The computing device may have wireless communication capability that allows a user to wirelessly control the actuators of the computing device, for example, to lock or unlock the enclosure, or to depress a button of the key fob secured within the enclosure while the key fob is secured within the enclosure.

The secure enclosure may be reconfigurable to accommodate a wide variety of key fob button configurations. For example, the secure enclosure may accommodate actuators located at different positions within the secure enclosure. The different actuator positions may correspond to different buttons of the object (e.g., door unlock, trunk open, or the like, on a key fob) enclosed in the secure enclosure. The secure enclosure may also include pins that may depress a button of the object in response to the actuators forcing a corresponding button of the object into a region of the pins.

In some examples, the pins may be movable to accommodate different button configurations. By employing different actuator positions and/or pin positions, a user of the secure enclosure can accommodate different button configurations of objects (e.g., key fobs) enclosed in the secure enclosure.

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

In the following description of the various embodiments, reference is made to the accompanying drawings, which form a part hereof, and in which is shown by way of illustration, various embodiments of the disclosure that can be practiced. It is to be understood that other embodiments can be utilized.

Aspects described herein relate to a secure enclosure for holding an object having buttons, such as a key fob. The secure enclosure allows a user to place a key fob inside a cavity formed by a housing of the enclosure. The secure enclosure also includes a locking mechanism that allows the user to lock and unlock the enclosure so that unauthorized users cannot access the enclosed key fob. An actuator, referred to as a "locking actuator," may control the locking and unlocking mechanism. The secure enclosure may also include one or more actuators, referred to as "button actuators." Each button actuator may force or cause a corresponding button of an enclosed key fob into contact (e.g., forced contact) with an underlying region of pins to depress the corresponding button. The secure enclosure may support different configurations of button actuators to accommodate different physical configurations of buttons in the enclosed key fob. The secure enclosure also includes a computing device, which may control the locking actuator and/or one or more button actuators. The computing device may include a wireless communication device, which allows authenticated users to connect and wirelessly operate the actuator(s) in order to lock and unlock the secure enclosure and to activate buttons of a key fob stored inside the secure enclosure via any of a variety of short and/or long range wireless communication protocols as described herein.

These and various other arrangements will be described more fully herein. As will be appreciated by one of skill in the art upon reading the following disclosure, various aspects described herein can be embodied as a method, apparatus, a computer system, or a computer program product. Accordingly, various aspects of this disclosure can take the form of an entirely hardware embodiment, an entirely software embodiment, or at least one embodiment combining software and hardware aspects. Furthermore, such aspects can take the form of a computer program product stored by one or more computer-readable storage media having computer-readable program code, or instructions, embodied in or on the storage media. Any suitable computer-readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

Secure Enclosure

Figure 1A:
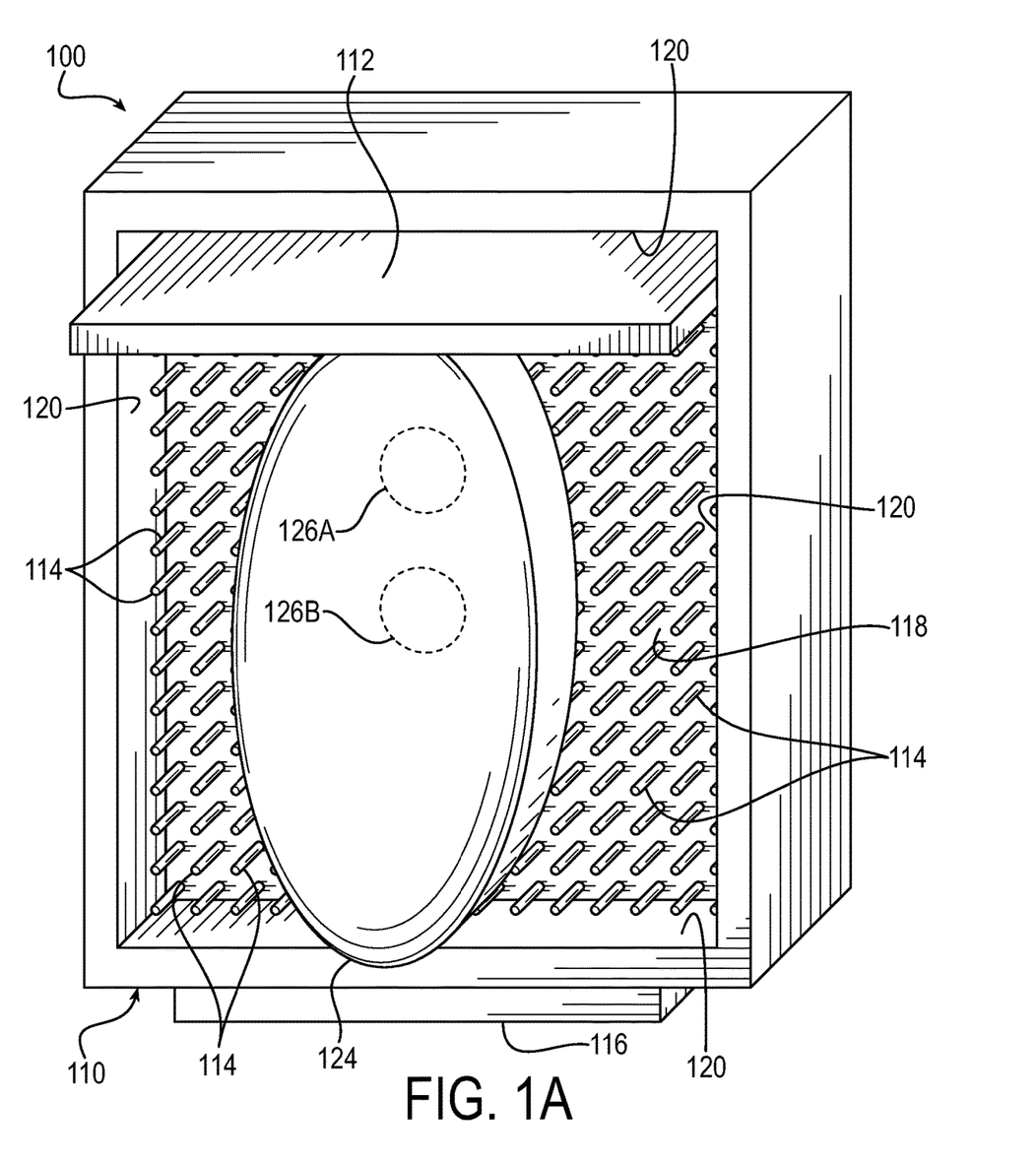
FIG. 1A is a perspective view of an open interior of a first housing of a secure enclosure that is holding or otherwise includes a key fob in accordance with one or more aspects of this disclosure.

Turning now to FIG. 1A, a perspective view of a first housing 110 of a secure enclosure 100 that is holding or otherwise includes a key fob in accordance with at least one embodiment is shown. FIG. 1A illustrates a top-down perspective view of an open interior of first housing 110 of secure enclosure 100, which may enclose or contain, for example, a key fob 124. Obscured elements (i.e., elements covered by other elements) are illustrated in broken lines in FIG. 1A.

Secure enclosure 100 may generally be any enclosure that is adapted to enclose an object having buttons (e.g., a key fob, such as key fob 124). Secure enclosure 100 may be made of metal, plastic, or any other material that is sufficiently strong enough to resist tampering. Secure enclosure 100 also includes a computing device (not shown in FIG. 1A for the purpose of simplicity, and described in greater detail with respect to FIG. 2). In some examples, the computing device (e.g., computing device 200 illustrated in FIG. 2) may be attached to first housing 110, or second housing 150 (illustrated in FIG. 1C) and may include user input components such as a keypad, touchscreen, or the like.

First housing 110 may include a retaining fence 112, pins 114, a locking mechanism 116, a bottom portion 118, and side portions 120. First housing 110 encloses a key fob 124. Key fob 124 includes buttons 126A and 126B.

First housing 110 may generally be square or rectangular in shape, and may have a bottom portion 118 that is perpendicular to four side portions 120. The interior of bottom portion 118 and side portions 120 form a cavity 130 (illustrated in greater detail with respect to FIG. 1D) in which key fob 124 is secured or contained.

Pins 114 may be attached to bottom portion 118 and protrude into cavity 130 formed by bottom portion 118 and side portions 120. Pins 114 may all be of the same shape or may have differing shapes. Pins 114 may be arranged in a grid or in any other configuration. Pins 114 may be arranged in various other configurations as well. A user of secure enclosure 100 may place a key fob 124 portion down onto pins 114 such that the buttons 126A and 126B of key fob 124 are in contact or nearly in contact with pins 114. To accommodate different positions of key fob buttons, and as discussed in greater detail herein, pins 114 may be movable to different positions of bottom portion 118 and/or removable from bottom portion 118.

As described in greater detail herein, when an actuator located on second housing 150 (FIG. 1C) of secure enclosure 100 is activated, the actuator presses the region of the key fob 124 underneath the actuator into the underlying region of pins 114, causing a corresponding button of key fob 124 (e.g., button 126A or 126B) located underneath the actuator to be depressed.

First housing 110 also includes a retaining fence 112, which provides a force (such as friction or another mechanical force) on key fob 124 to stop key fob 124 from moving within secure enclosure 100, and thereby hold key fob 124 securely in place. Retaining fence 112 may include a movable member including a piece of plastic, metal, or any other material that is sufficiently rigid to secure key fob 124 in place. According to some embodiments, retaining fence 112 may be spring loaded to provide pressure along at least one portion of key fob 124, and to push key fob 124 into contact with both retaining fence 112 and an opposite-facing one of side portions 120. Retaining fence 112 may take various other forms as well.

First housing 110 may also include a locking mechanism 116. Locking mechanism 116 may generally have one or more bolts or bearings that engage in a receiving portion such that, when the bolt is engaged in the receiving portion, the first and second portions of locking mechanism 116 may be lockably coupled. When the bolt is disengaged from the receiving portion, the bottom and top portions of locking mechanism 116 may removably engaged. Locking mechanism 116 may be affixed to one of side portions 120, and may include any type of locking mechanism that is capable of securing first housing 110 with second housing 150 (illustrated in FIG. 1C) such that the first housing 110 cannot be separated from second housing 150 without extraordinary effort or tampering. According to some examples, an actuator may operate locking mechanism 116. One or more computing devices may control the actuator that operates locking mechanism 116.

Figure 1B:
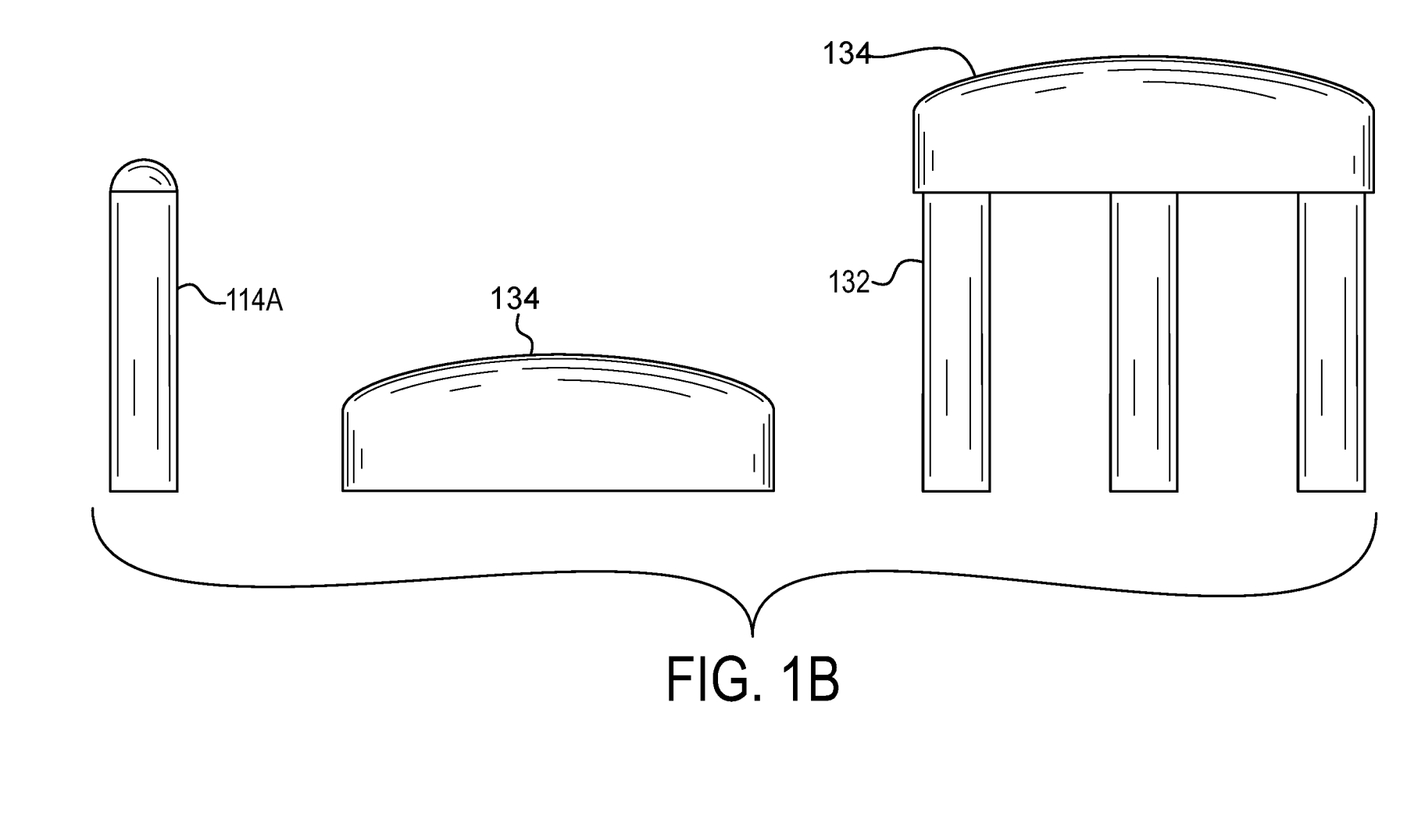
FIG. 1B is a plan view of a pin, an unattached pin cap, and an attached pin cap in accordance with one or more aspects of this disclosure.

FIG. 1B is a plan view of a single pin 114A of pins 114, an unattached pin cap 134 shown in isolation, and pin cap 134 shown connected or attached to a number of pins 132. As illustrated by pin 114A, pin 114A may be cylindrically shaped with a tapered or semi-spherical head. Having a tapered or semi-spherical head may avoid the top of pin 114A being stuck along an edge of key fob 124 when pin 114A contacts key fob 124. Generally, pins 114 may be made of metal, plastic, rubber, or any other material capable of depressing a button on a key fob. Pins 114 may take various other forms as well.

The first housing 110 may include a variety of holes that extend through the top face of the bottom portion. The holes of first housing 110 would not extend all the way through to the bottom face (e.g., the first housing 110 may be solid or may be perforated). The holes may be substantially similar in diameter to the pins 114 such that a pin, when inserted into the hole, is removably engaged to the hole via friction or another locking mechanism. The pins can be removed by pulling the pin out of the hole such that the pins can be inserted into the bottom portion in any configuration as appropriate to the requirements of specific embodiments of the invention.

In FIG. 1B, pin cap 134 is illustrated as having an substantially oval shape for the purpose of example, but may have other shapes (e.g., circular, square, etc.) as well. The pin caps may come in a variety of shapes to accommodate different key fob button shapes. There may be more than one pin cap that may attach to pins 114. Each pin cap may be attached to the pins below a corresponding key fob button. For example, a user may attach a pin cap to pins 114 beneath button 126A, and may attach another pin cap to the region of pins 114 beneath button 126B. The presence of a pin cap may enable a key fob button to be more accurately depressed when an actuator pushes the key fob downward toward an underlying pin cap. Because the pin caps (e.g., pin cap 134) are removable, the pin caps may be re-attached to different groups of pins 114 to accommodate different key fob button positions.

Figure 1C:
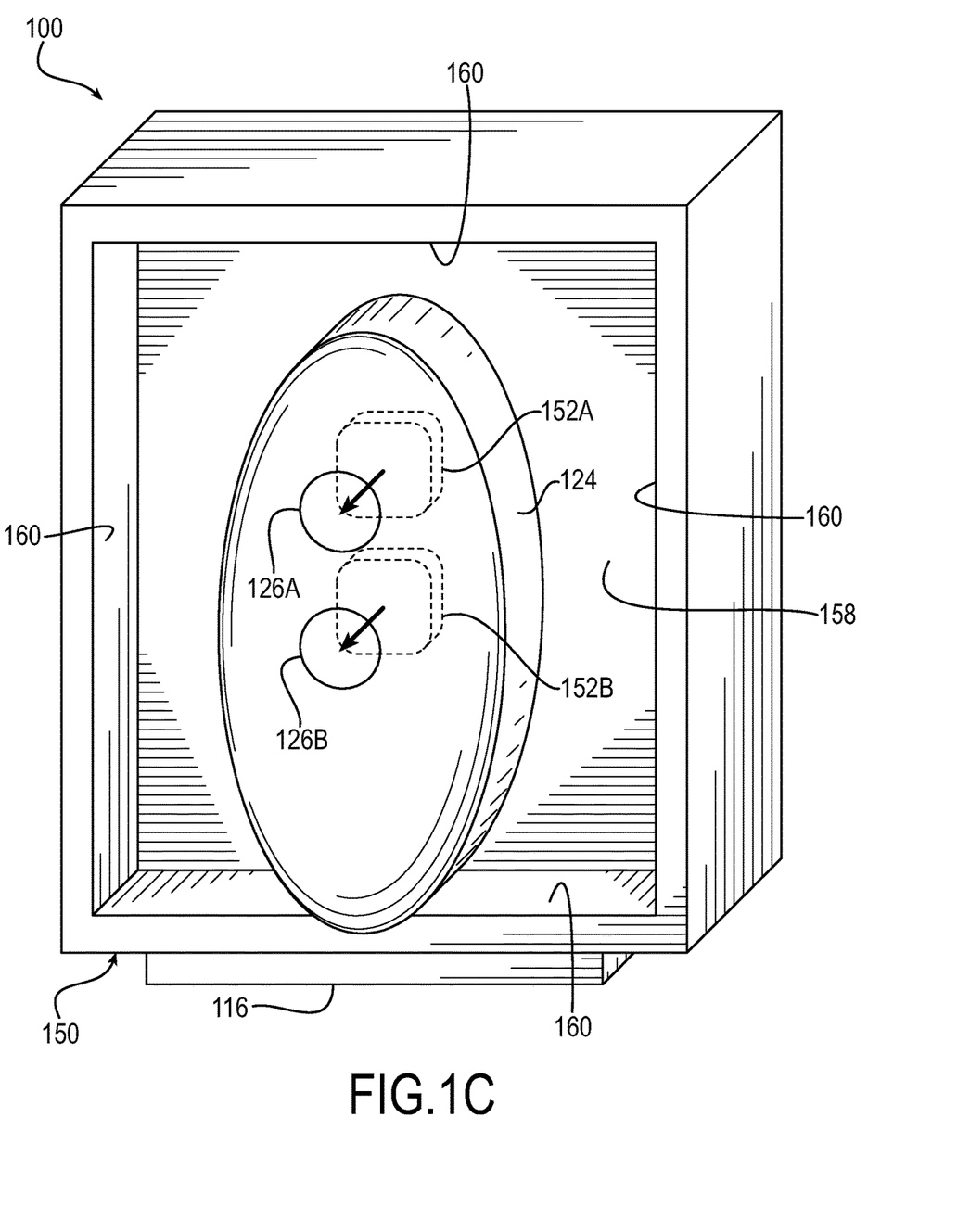
FIG. 1C is a perspective view of a second housing of the same secure enclosure holding or otherwise including a key fob in accordance with one or more aspects of this disclosure.

Turning now to FIG. 1C, a perspective view of a second housing 150 of the same secure enclosure 100 holding or otherwise including key fob 124 in accordance with at least one embodiment is shown. Second housing 150 includes button actuators 152A-152B ("button actuators 152"), a top portion of locking mechanism 116 that latches with second portion of locking mechanism 116, and a top portion 158, which may be parallel to bottom portion 118 when secure enclosure 100 is latched shut.

Second housing portion 150 also includes side portions 160, which may be perpendicular to each other and may each also be perpendicular to top portion 158. While side portions 160 are illustrated as being perpendicular (e.g., square) with each another, side portions 160 may also be oblique with respect to each other. Second housing 150 may include a sealing or weatherproofing mechanism (e.g., on sides portions 160).

FIG. 1C is illustrated from the perspective of key fob 124 being closest to the viewer, and buttons 126 of key fob 124 face the viewer. Button actuators 152 are positioned behind the backside of key fob 124.

Second housing 150 is adapted to fit with first housing 110 (FIG. 1). According to some embodiments, second housing 150 may be coupled with first housing 110 with a hinge (not shown) or another coupling mechanism, fastener, or the like. Second housing 150 may be secured to first housing 110 with locking mechanism 156.

As illustrated in FIG. 1C, second housing 150 includes two button actuators 152A and 152B. Although two button actuators 152A and 152B are illustrated, there may be any number of actuators. The number of button actuators included in top housing 150 may be based on a number of buttons of the object (e.g., key fob) enclosed within secure enclosure 100. Button actuators 152 are illustrated as having a square shape for the purpose of example. However, it should be understood that button actuators 152 may be circular, elliptical, lobe-shaped, or any other shape that, when activated, may cause one or more buttons of key fob 124 enclosed within secure enclosure 100 to be depressed.

A computing device may control the operation of button actuators 152. The computing device may be communicatively coupled to each of button actuators 152 via one or more wires (not pictured) such that the computing device may activate each actuator. Additionally or alternatively, the button actuators may be wirelessly activated by the computing device via one or more wireless signals.

When activated, one of button actuators 152, such as button actuator 152A, may exert a downward force on the back of key fob 124, and specifically on the region of key fob 124 covered by button actuator 152A. As a result of the downward force that the actuator (in this example, button actuator 152A) exerts on key fob 124, the front-facing region of key fob 124 corresponding to the region underneath button actuator 152A is pressed into a corresponding region of one or more of pins 114. Consequently, if key fob 124 includes a button, such as button 126A, that is located underneath the actuated region, pins 114 would depress button 126A. While button actuators 152 are illustrated as being partially aligned with buttons 126A and 126B in FIG. 1C, the button actuators may or may not be exactly or nearly exactly aligned with the buttons.

In order to accommodate a wide variety of key fob button configurations (e.g., different button positions and/or button shapes), the secure enclosure may accommodate a variety of second housings that each have different button actuator configurations in order to accommodate different key fob button configurations. For example, there may be a second housing 150 having three button actuators that are aligned vertically in order to accommodate a key fob having a corresponding button configuration. As another manner of accommodating different key fob button configurations, button actuators 152 may be repositioned and/or reconfigured in various manners. For instance, button actuators 152 may be added, removed, translated (e.g., moved horizontally or vertically) and/or rotated along top portion 158. According to various embodiments, button actuators 152 may be repositioned along a grid on top portion 158.

Figure 1D:
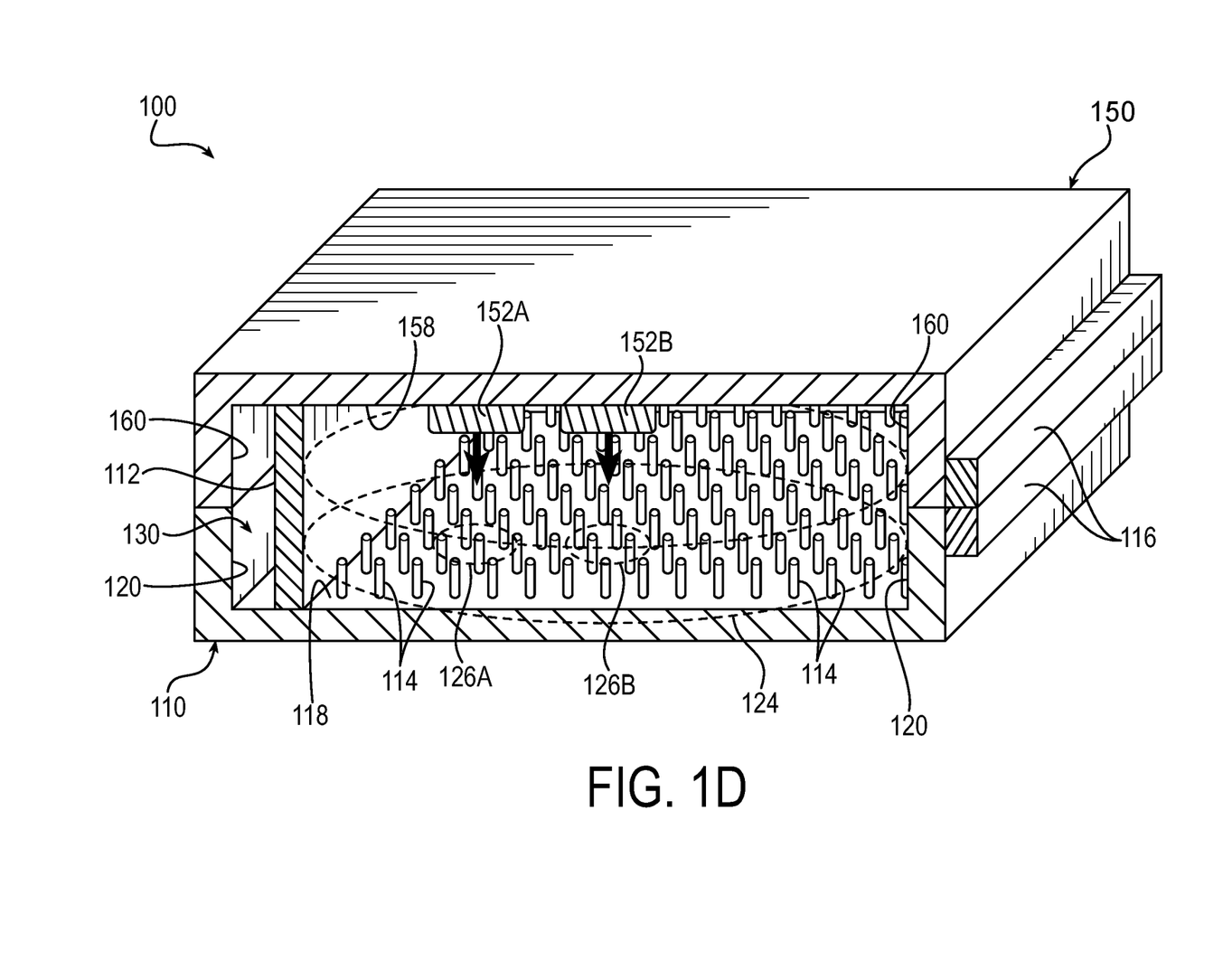
FIG. 1D is a side perspective view of the first and second housings of the secure enclosure holding or otherwise including a key fob in accordance with one or more aspects of this disclosure.

Turning now to FIG. 1D, a side perspective of the first and second housings of secure enclosure 100 holding or otherwise including key fob 124 in accordance with at least one embodiment is illustrated. In FIG. 1D, secure enclosure 100 includes second housing 150 (as illustrated from a different perspective in FIG. 1C) and first housing 110 (as illustrated from a different perspective in FIG. 1A). First housing 110 and second housing 150 are shown as fitted together. The side portions of first housing 110 and second housing 150 nearest to the viewer are not shown for ease of visibility. Pins 114 are attached to first housing 110, and button actuators 152 are attached to top portion 158 of second housing 150.

Second housing 150 and first housing 110 form a cavity 130. Key fob 124 is illustrated within cavity 130 as secured by retaining fence 112 and resting face down on top of pins 114. Button actuators 152 are in contact with the backside of key fob 124. As illustrated by the arrows, when button actuator 152A or 152B is activated, the button actuator generates a force on the backside of key fob 124.

Button actuator 152A is positioned over button 126A of key fob 124, and button actuator 152B is positioned over button 126B. When button actuator 152A is activated, the force that button actuator 152A imparts on key fob 124 causes one or more of pins 114 (which may be covered by an actuator cap) to depress button 126A. Similarly, when button actuator 152B is activated, the force of button actuator 152B causes a different group of pins 114 (which may be covered by another actuator cap) to depress button 126B.

Figure 2:
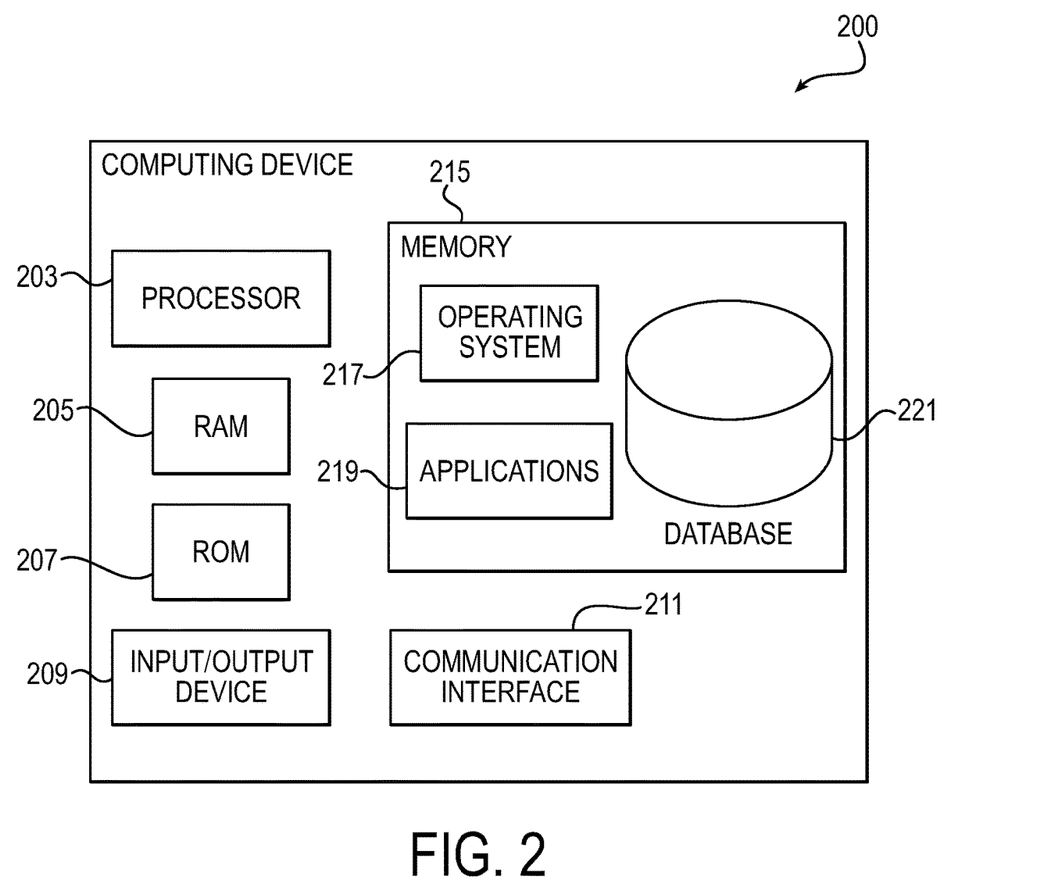
FIG. 2 is a conceptual diagram of a computing device in accordance with one or more aspects of this disclosure.

Turning now to FIG. 2, a computing device 200 in accordance with at least one embodiment of the invention is shown. The computing device of secure enclosure 100 and/or a user computing device could both include one or more of the components described with respect to FIG. 2. The computing device 200 can include a processor 203 for controlling overall operation of the computing device 200 and its associated components, including RAM 205, ROM 207, input/output device 209, communication interface 211, and/or memory 215. A data bus can interconnect processor(s) 203, RAM 205, ROM 207, memory 215, I/O device 209, and/or communication interface 211.

Input/output (I/O) device 209 can include a microphone, keypad, touch screen, and/or stylus through which a user of the computing device 200 can provide input, and can also include one or more of a speaker for providing audio output and a video display device for providing textual, audiovisual, and/or graphical output. Software can be stored within memory 215 to provide instructions to processor 203 allowing computing device 200 to perform various actions. For example, memory 215 can store software used by the computing device 200, such as an operating system 217, application programs 219, and/or an associated internal database 221. The various hardware memory units in memory 215 can include volatile and nonvolatile, removable and non-removable media implemented in any method or technology for storage of information such as computer-readable instructions, data structures, program modules or other data. Memory 215 can include one or more physical persistent memory devices and/or one or more non-persistent memory devices. Memory 215 can include, but is not limited to, random access memory (RAM) 205, read only memory (ROM) 207, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 203.

Communication interface 211 can include one or more transceivers, digital signal processors, and/or additional circuitry and software for communicating via any network, wired or wireless, using any protocol including those described herein. According to some examples, communication interface 211 may include a wireless communication interface. The wireless communication interface may communicate with other computing devices via Bluetooth (e.g., Bluetooth Low Energy), satellite, GSM infrared, IEEE 802.11, WiMAX, RFID, cellular, and/or any suitable wireless communication media, standards, and protocols.

Processor 203 can include a single central processing unit (CPU), which can be a single-core or multi-core processor (e.g., dual-core, quad-core, etc.), or can include multiple CPUs. Processor(s) 203 and associated components can allow the computing device 200 to execute a series of computer-readable instructions to perform some or all of the processes described herein. Although not shown in FIG. 2, various elements within memory 215 or other components in computing device 200, can include one or more caches, for example, CPU caches used by the processor 203, page caches used by the operating system 217, disk caches of a hard drive, and/or database caches used to cache content from database 221. For embodiments including a CPU cache, the CPU cache can be used by one or more processors 203 to reduce memory latency and access time. A processor 203 can retrieve data from or write data to the CPU cache rather than reading/writing to memory 215, which can improve the speed of these operations. In some examples, a database cache can be created in which certain data from a database 421 is cached in a separate smaller database in a memory separate from the database, such as in RAM 205 or on a separate computing device. For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of software deployment systems, such as faster response times and less dependence on network conditions when transmitting and receiving data.

One or more power sources (not pictured) may power computing device 200. Batteries (e.g., lithium ion, nickel metal hydride, etc.), capacitors (e.g., super capacitors, ultra capacitors, etc.), energy harvesters (e.g., solar, thermal, etc.) may be examples of such power sources. The capacitor and/or energy harvester may charge a battery that can be used to power the computing device. Such capacitors may typically store and provide energy from 1 minute to 1 week. Such batteries may provide long-term energy storage when the energy harvesters are unable to provide enough energy to the capacitors to keep computing device 200 running. The one or more power sources may be mounted within secure enclosure 100. Mounting the power source(s) within secure enclosure 100 may prevent tampering with the operation of secure enclosure 100. Such power sources may be rechargeable (e.g., via USB, AC, or DC power sources).

Although various components of computing device 200 are described separately, functionality of the various components can be combined and/or performed by a single component and/or multiple computing devices in communication without departing from the invention.

As described above, a computing device, such as computing device 200, may control various aspects and/or components of secure enclosure 100. For instance, computing device 200 may control the operation of button actuators (e.g., actuators 152), locking actuators (e.g., locking mechanism 116), and may also communicate with other computing devices via a wireless connection.

Operating Environments

Figure 3:
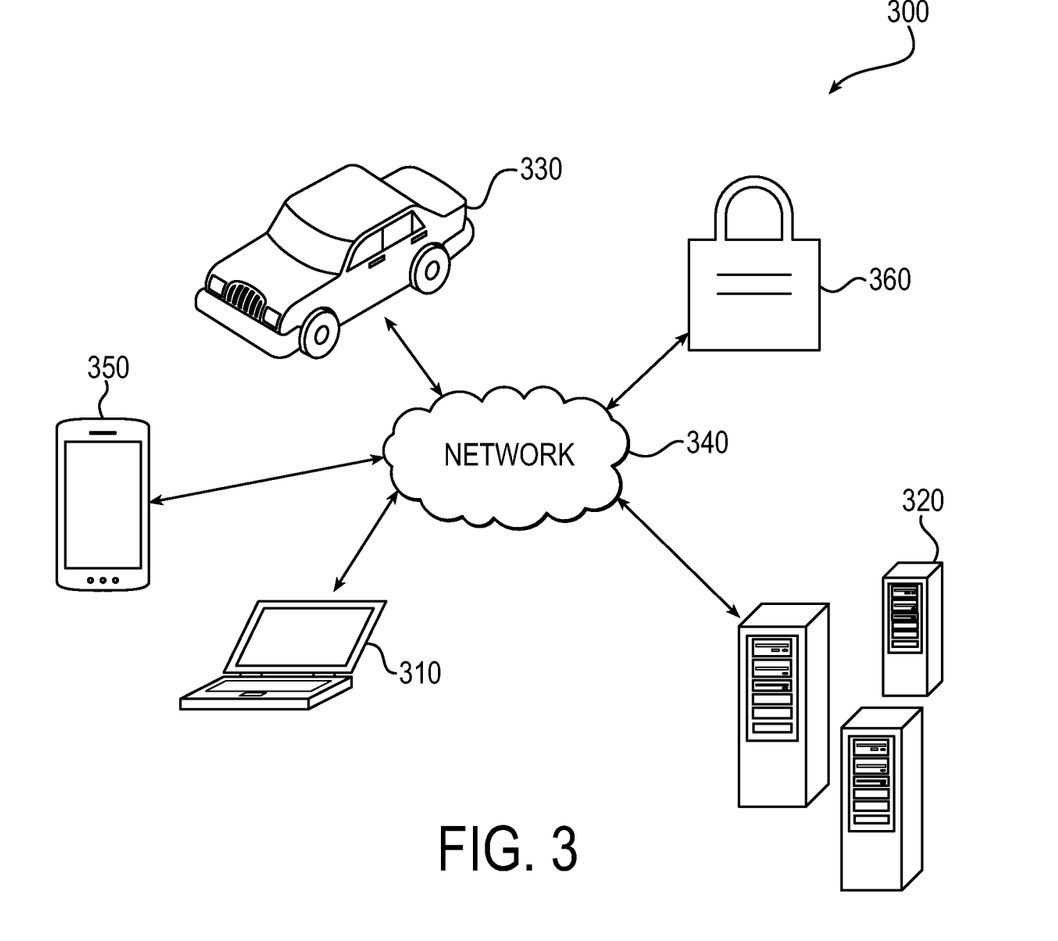
FIG. 3 is a conceptual diagram of a computer system including a secure enclosure in accordance with one or more aspects of this disclosure.

FIG. 3 illustrates an operating environment 300 in accordance with at least one embodiment of the invention. The operating environment 300 includes at least one client device 310, at least one server system 320, at least one vehicle 330, at least one mobile computing device 350, and/or at least one secure enclosure 360 in communication via a network 340. Any of the devices and systems described herein can be implemented, in whole or in part, using one or more computing devices described with respect to FIG. 3.

Client devices 310, server systems 320, and/or mobile computing device 350, may allow users to communicate with the at least one secure enclosure 360, which may securely enclose a key fob for vehicle 330. The network 340 can include a local area network (LAN), a wide area network (WAN), a personal area network (PAN), a wireless telecommunications network, and/or any other communication network or combination thereof.

Secure enclosure 360 may receive a signal, having a payload including one or more messages, from another computing device described herein (e.g., client devices 310, mobile computing device 350, server system 320) via a wireless communication interface. Such messages may be generated by a software application running on any of such computing devices. For example, secure enclosure 360 may receive such messages from a server system (e.g., server system 320) or from mobile computing device 350.

The received messages may indicate an action that secure enclosure 360 is to perform. For example, such a message may instruct secure enclosure 360 to activate a given button actuator, such as actuator, or a locking actuator that controls locking mechanism. Such messages may take various other forms as well. In response to receiving such messages, a computing device of secure enclosure 360 may take the action indicated by the received message.

According to various embodiments, secure enclosure 360 may authenticate the received messages before taking any such actions. Secure enclosure 360 may authenticate the received messages in various manners. According to some examples, a server (e.g., server system 320) may be used to authenticate a message sender with secure enclosure 360. In some instances, secure enclosure 360 may authenticate the sender of a received message using public key cryptography. For example, computing device and the sender of such messages may utilize TLS (Transport Layer Security), which uses X.509 certificates to authenticate a message sender. Secure enclosure 360 may authenticate message senders in various other manners as well.

According to various embodiments, there may be multiple secure enclosures 360, which one or more users may control. To allow such control over multiple enclosures, each secure enclosure may have its own certificate, which may be programmed onto each of secure enclosures 360. To allow one user to control multiple secure enclosures, intermediate security certificates for the multiple enclosures may be generated. An intermediate certificate may allow a computing device in possession of an intermediate certificate's private key to authenticate with the multiple secure enclosures.

According to various embodiments, secure enclosure 360 may store one or more maps of actuator locations and key fob button functions. Such maps may allow a user of secure enclosure to perform key fob functions that are stored in the maps. For instance, a key fob, such as key fob, may have multiple buttons. Each button may perform one or more functions. As an example, one button may unlock a single door of vehicle 330 if pressed once, and may unlock all doors of vehicle 330 if pressed twice in succession. Similarly, a given button may perform different functions depending on whether the button is pressed or held.

However, users of secure enclosure who wish to use the key fob that is stored in the secure enclosure may be unaware of the button configuration of a key fob stored within secure enclosure, but may still wish to be able to use all the functions of that key fob. In order to make all the functions of a key fob stored within secure enclosure easily accessible to a user, mappings between a given function of a key fob and a corresponding actuator and activation time of that actuator may be maintained.

In some examples, a computing device, such as client device 310 or mobile computing device 350 may maintain such mappings according to various embodiments. The application may, for example, display a mapping of key fob functions, for instance with a GUI (Graphical User Interface), which allows the user to select a given function to be performed by the secure enclosure. Based on receiving a selection, via the GUI, of selected function, the application may transmit a message to secure enclosure 360 indicating an actuator that is to be actuated and/or an amount of time (e.g., a duration) that the selected actuator is to be actuated in order to perform the indicated function. Secure enclosure 360 may receive the message and, based on the received message, may activate the selected actuator for the period of time specified in the message.

In some embodiments, secure enclosure 360 may store such mappings of key fob functions. Secure enclosure 360 may activate a mapping based on receiving a message (e.g., from a computing device) indicating the map to be activated. Secure enclosure 360 may also receive a message from one of the computing devices disclosed herein that defines such a mapping. Based on such a message, secure enclosure 360 may store the mapping in a memory.

Configuring and Operating Secure Enclosures

Figure 4:
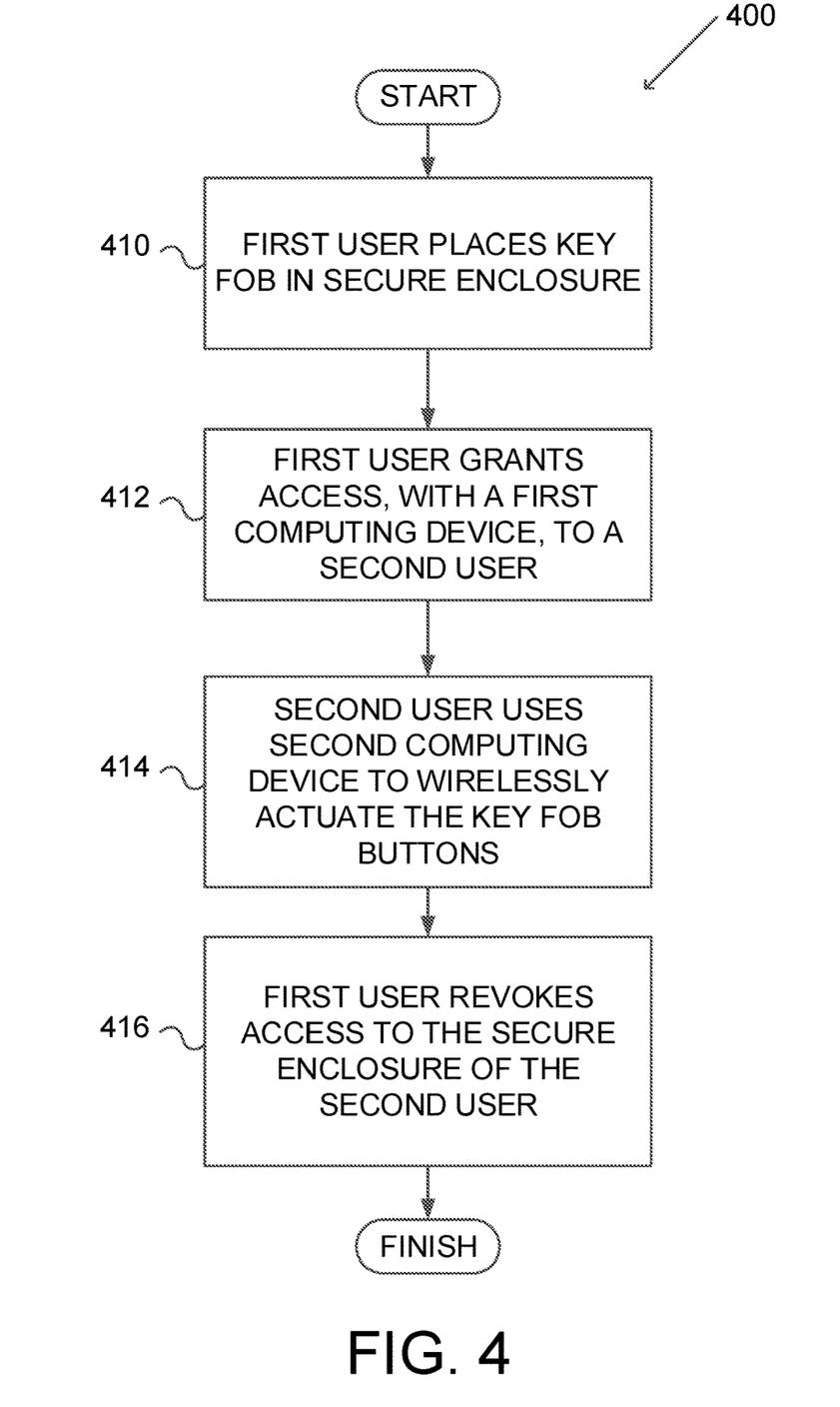
FIG. 4 is a flow chart illustrating a process for configuring and operating the secure enclosure in accordance with one or more aspects of this disclosure.

FIG. 4 is a flow chart illustrating a process for configuring and using a secure enclosure in accordance with at least one embodiment. Some or all of the steps of process 400 may be performed using any of the computing devices and/or combination thereof described herein. In a variety of embodiments, some or all of the steps described below can be combined and/or divided into sub-steps as appropriate.

At step 410, a first user may place a key fob within a secure enclosure. The first user may place the key fob face down within the secure enclosure (e.g., first housing) such that the pins touch or contact the key fob and/or the key fob buttons. In some examples, the user may also select a second housing having a configuration of button actuators that corresponds to the key fob buttons. After placing the key fob inside the secure enclosure, the first user may use the retaining fence and the locking mechanism to lock the key fob inside the secure enclosure (e.g., by connecting the first housing to the second housing).

The first user may also authenticate a first computing device, associated with the first user, with the secure enclosure (e.g., using TLS and/or X.509 certificates). Authenticating the first computing device with secure enclosure, may allow the first user to control the functionality of the secure enclosure (e.g., to actuate the key fob buttons and/or lock or unlock the enclosure) and to grant other users access to the functionality of the secure enclosure.

At step 412, the first user may use the first computing device associated with the first user to grant a second user, associated with a second computing device, wireless access to the secure enclosure. To grant the second user access to the secure enclosure, the first user may use the first computing device, for example, to send cryptographically signed credentials (e.g., X.509 certificates) to the secure enclosure or to the second computing device. Sending such credentials may allow the second computing device to prove that it has been granted access to use the functionality of the secure enclosure.

At step 414, the second user may use the second computing device to wirelessly actuate the key fob buttons of the secure enclosure, for example, to: start the vehicle, unlock the car doors, and/or perform various other actions with respect to the vehicle. The proximity of the key fob to the inside of the vehicle may allow the vehicle to be started without providing access to the key fob itself. The second user may actuate the key fob buttons via an application that runs on the second computing device, and causes the second computing device to send wireless messages to the secure enclosure. Based on receiving such wireless messages, the secure enclosure may activate one or more button actuators, thereby causing depression of a selected button on the key fob (e.g., via pins within the secure enclosure).

At step 416, the first user may decide to revoke the access privileges of the second user to the secure enclosure. To revoke such privileges, the first user may utilize the first computing device to send a message to the secure enclosure indicating that the second user's granted access privileges to the secure enclosure. Based on the message, the secure enclosure may then revoke the second user's access to control the secure enclosure. In some examples, user privileges may be automatically revoked upon expiration of a predetermined time period (e.g., one hour, one day, one week, or the like).

Figure 5:
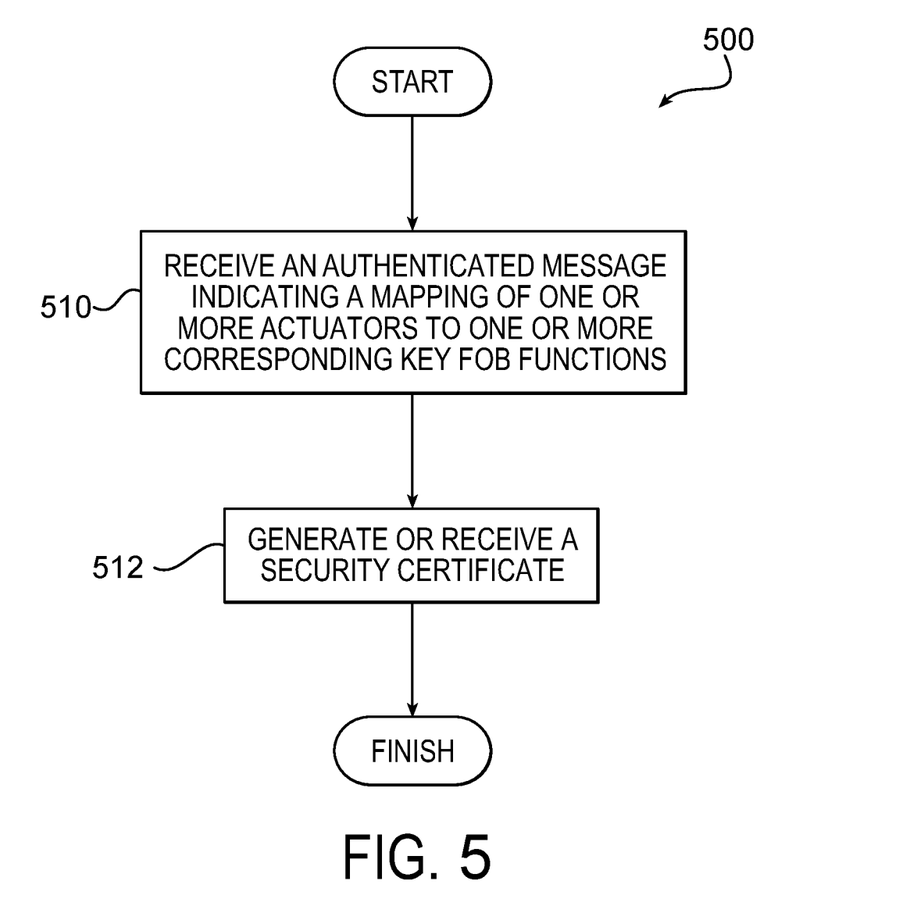
FIG. 5 is a flow chart illustrating a process for configuring a secure enclosure in accordance with one or more aspects of this disclosure.

FIG. 5 is a flow chart illustrating a process for configuring a secure enclosure in accordance with at least one embodiment. Some or all of the steps of process 500 may be performed using any of the computing devices and/or combination thereof described herein. In a variety of embodiments, some or all of the steps described below can be combined and/or divided into sub-steps as appropriate.

At step 510, the secure enclosure may receive, from a computing device, an authenticated message indicating a mapping of one or more actuators to one or more corresponding key fob functions. The mappings may define the functions of the key fob that occur when a given actuator is activated. For example, not every key fob may have a door unlock button in the same position. Such a mapping may define which actuator depresses a door unlock button of the key fob.

At step 512, the secure enclosure may generate a security certificate, or may receive a security certificate from another computing device. The security certificate may ensure that only authorized users may utilize the functionality of the secure enclosure.

Operating Secure Enclosures

Figure 6:
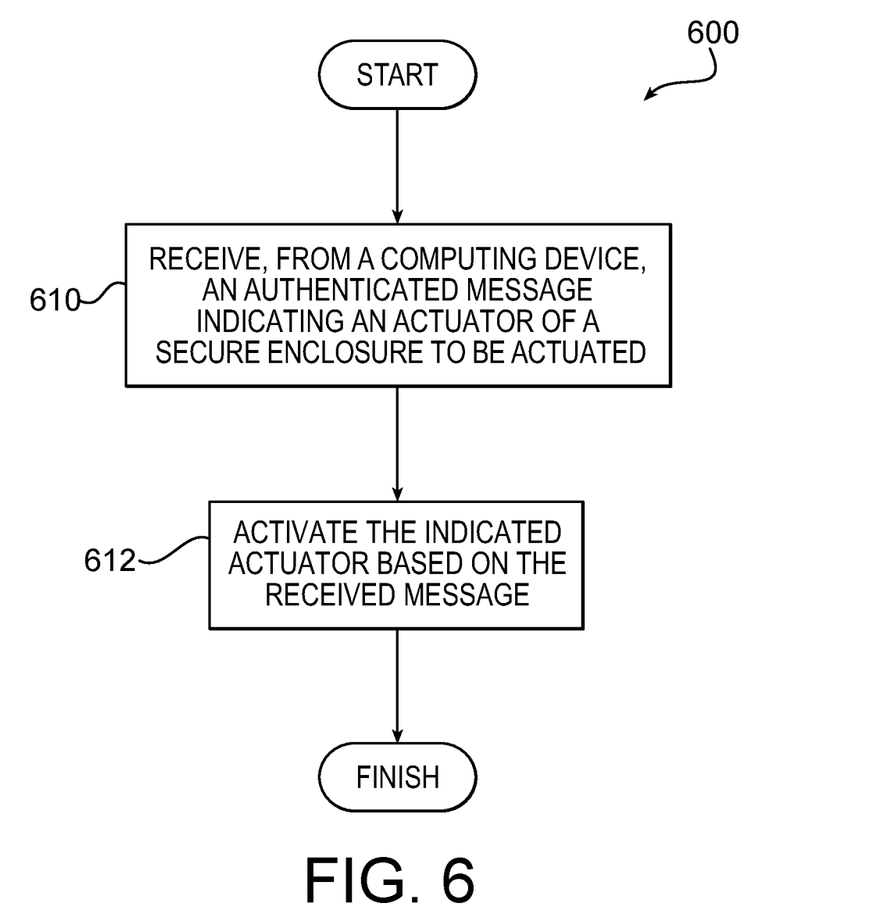
FIG. 6 is a flow chart illustrating a process for operating a secure enclosure in accordance with one or more aspects of this disclosure.

FIG. 6 is a flow chart illustrating a process for operating a secure enclosure in accordance with at least one embodiment of the invention. Some or all of the steps of process 600 may be performed using any of the computing devices and/or combination thereof described herein. In a variety of embodiments, some or all of the steps described below can be combined and/or divided into sub-steps as appropriate.

At step 610, the secure enclosure may receive, from a computing device, an authenticated message indicating an actuator of the secure enclosure to be activated. The actuator may be one of the button actuators along the top portion of the secure enclosure, or a locking actuator that controls a locking mechanism in various examples.

At step 612, the secure enclosure may activate the indicated actuator based on the actuator indicated in the received message. For example, the secure enclosure may receive a message indicating a particular actuator is to be activated. Based on receiving the message, the secure enclosure may then activate the actuator.

One or more aspects discussed herein can be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules can be written in a source code programming language that is subsequently compiled for execution, or can be written in a scripting language such as (but not limited to) HTML, JavaScript, or XML. The computer executable instructions can be stored on a computer readable medium such as a hard disk, optical disk, removable storage media, solid-state memory, RAM, and the like. As will be appreciated by one of skill in the art, the functionality of the program modules can be combined or distributed as desired in various embodiments. In addition, the functionality can be embodied in whole or in part in firmware or hardware equivalents such as integrated circuits, field programmable gate arrays (FPGA), and the like. Particular data structures can be used to more effectively implement one or more aspects discussed herein, and such data structures are contemplated within the scope of computer executable instructions and computer-usable data described herein. Various aspects discussed herein can be embodied as a method, a computing device, a system, and/or a computer program product.

Although the present invention has been described in certain specific aspects, many additional modifications and variations would be apparent to those skilled in the art. In particular, any of the various processes described above can be performed in alternative sequences and/or in parallel (on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A secure enclosure comprising:
   a first housing comprising:
      a plurality of pins that are attached to a bottom portion of the first housing;
   a second housing configured to correspondingly connect with the first housing, the second housing comprising:
      a first actuator and a second actuator positioned along the second housing; and
   a locking mechanism that, when locked, is adapted to secure the first housing to the second housing; and
   wherein the first actuator is positioned such that, when the first actuator is activated:
      an object, having a first button and a second button and arranged within a cavity of the secure enclosure, is moved into forced contact with a first portion of the plurality of pins, thereby activating the first button, and
   wherein the second actuator is positioned such that, when the second actuator is activated:
      the object is moved into forced contact with a second portion of the plurality of pins, thereby activating the second button.

2. The secure enclosure of claim 1, further comprising:
   one or more processors; and
   a memory storing instructions, that, when executed by the one or more processors, cause the secure enclosure to:
      receive, from a computing device, a wireless signal; and
      activate at least one of the first actuator or the second actuator based on receiving the wireless signal.

3. The secure enclosure of claim 2, wherein the wireless signal causes the at least one of the first actuator or the second actuator to be activated.

4. The secure enclosure of claim 2, wherein the wireless signal comprises at least one of: a Wi-Fi signal or a Bluetooth signal.

5. The secure enclosure of claim 2, wherein the instructions that cause the one or more processors to receive the wireless signal further comprise instructions that, when executed, cause the one or more processors to:
   authenticate a sender of the wireless signal; and
   activate the at least one of the first actuator or the second actuator based on the sender being authenticated.

6. The secure enclosure of claim 2, wherein the activation of the at least one of the first actuator or the second actuator causes the at least one of the first actuator or the second actuator to exert a force perpendicular to the second housing.

7. The secure enclosure of claim 2, wherein the wireless signal comprises a payload encrypted with Transport Layer Security (TLS).

8. The secure enclosure of claim 2, further comprising instructions that, when executed, cause the secure enclosure to:
based on receiving the wireless signal, either lock or unlock the locking mechanism.

9. The secure enclosure of claim 1, wherein a cap is attached to, and covers tops of, at least some of the plurality of pins.

10. The secure enclosure of claim 1, wherein the plurality of pins are perpendicular to the bottom portion, and
wherein at least some of the plurality of pins have a semi-spherical head.

11. The secure enclosure of claim 1, wherein the object comprises a key fob.

12. The secure enclosure of claim 1, further comprising a movable member adapted to secure the object within the cavity.

13. A system comprising:
a secure enclosure including a computing device;
the secure enclosure adapted to contain a key fob within a housing, the secure enclosure comprising:
first and second actuators;
a plurality of pins;
a locking mechanism;
one or more processors; and
a memory storing instructions that, when executed, by the one or more processors, cause the secure enclosure to:
receive, from the computing device, an authenticated message to activate at least one of a first actuator or a second actuator; and
activate the at least one of the first actuator or the second actuator based on receiving the message,.
wherein the key fob is moved into forced contact with a first portion of the plurality of pins when the first actuator is activated, thereby activating a first button of the key fob, and
wherein the key fob is moved into forced contact with a second portion of the plurality of pins when the second actuator is activated, thereby activating a second button of the key fob.

14. The system of claim 13, further comprising instructions that, when executed, cause the one or more processors to:
receive, from the computing device, a message indicating a mapping between a function of the key fob and a corresponding actuator of the first and second actuators.

15. The system of claim 14, further comprising instructions that, when executed, cause the one or more processors to:
based on the received mapping, activate the corresponding actuator.

16. The system of claim 13, wherein the message indicates at least one of: a duration that the at least one of the first actuator or the second actuator is to be activated or a number of times that the at least one of the first actuator or the second actuator is to be activated.

17. The system of claim 13, wherein the message is authenticated using Transport Layer Security (TLS).

18. A non-transitory machine-readable medium storing instructions that, when executed by one or more processors, cause the one or more processors to perform steps comprising:
receiving, from a computing device and via a wireless connection, an authenticated message indicating which of at least one of a first actuator or a second actuator of a secure enclosure to be activated; and
activating the at least one of the first actuator or the second actuator based on receiving the message,
wherein the first actuator is positioned such that when the first actuator is activated:
a key fob, having first and second buttons and arranged within a cavity of the secure enclosure, is moved into forced contact with a first portion of a plurality of pins of the secure enclosure, thereby activating the first button, and
wherein the second actuator is positioned such that when the second actuator is activated:
the key fob is moved into forced contact with a second portion of the plurality of pins of the secure enclosure, thereby activating the second button.

19. The non-transitory machine-readable medium of claim 18, wherein the instructions, when executed by one or more processors, further cause the one or more processors to perform steps comprising:
receiving, from a computing device, a message indicating a mapping between a function of the key fob and the first and second actuators.

20. The non-transitory machine-readable medium of claim 18,
wherein the authenticated message indicates at least one of: a duration that the at least one of the first actuator or the second actuator is to be activated or a number of times the at least one of the first actuator or the second actuator is to be activated.

* * * * *